US012303900B2

(12) United States Patent
Riaud et al.

(10) Patent No.: US 12,303,900 B2
(45) Date of Patent: May 20, 2025

(54) PHOTOACOUSTIC TWEEZERS

(71) Applicant: FUDAN UNIVERSITY, Shanghai (CN)

(72) Inventors: Antoine Jean-Pierre Rene Riaud, Shanghai (CN); Qing Wang, Shanghai (CN); Jia Zhou, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 17/617,545

(22) PCT Filed: Oct. 18, 2021

(86) PCT No.: PCT/CN2021/124323
§ 371 (c)(1),
(2) Date: Dec. 8, 2021

(87) PCT Pub. No.: WO2023/065064
PCT Pub. Date: Apr. 27, 2023

(65) Prior Publication Data
US 2024/0293815 A1  Sep. 5, 2024

(51) Int. Cl.
*B01L 3/00* (2006.01)
*G01N 15/14* (2006.01)
(Continued)

(52) U.S. Cl.
CPC ..... *B01L 3/502761* (2013.01); *B01L 3/50273* (2013.01); *G01N 15/1404* (2013.01);
(Continued)

(58) Field of Classification Search
None
See application file for complete search history.

(56) References Cited

U.S. PATENT DOCUMENTS

2020/0316586 A1* 10/2020 Riaud ................ G01N 29/2437

FOREIGN PATENT DOCUMENTS

WO   2017157426 A1   9/2017
WO   2019081521 A1   5/2019

OTHER PUBLICATIONS

D.J. Collins et al., "Acoustic tweezers via sub-time-of-flight regime surface acoustic waves," Science Advances, Jul. 13, 2016, pp. 1-8, vol. 2, Issue 7.

(Continued)

*Primary Examiner* — Jyoti Nagpaul

(57) ABSTRACT

The invention discloses a method and an apparatus for trapping and manipulating particles, relating to the field of acoustic manipulation. The invention discloses a photoacoustic tweezers, which use bimodal transducer generate a weak acoustic wave and a strong acoustic wave. The strong acoustic wave behaves as an effective gain medium to amplify the acoustic radiation force of this weak acoustic wave. After an interference of the strong acoustic wave and the weak acoustic wave, an amplified trapping force is produced for achieving the trapping and manipulation of particles. The invention can manipulate several particles simultaneously in high throughput and particles of various sizes ranging from 1 μm to 1 mm. The invention can form reconfigurable acoustic fields which permits versatile and selective manipulation with no need of complicated acoustic arrays. The invention is a versatile, biocompatible, selective and high-throughput manipulation method.

20 Claims, 2 Drawing Sheets

(51) Int. Cl.
*G01N 15/1404* (2024.01)
*G01N 15/1409* (2024.01)

(52) U.S. Cl.
CPC ..... *G01N 15/1409* (2024.01); *G01N 15/1425* (2013.01); *B01L 2200/0668* (2013.01); *B01L 2400/0436* (2013.01); *G01N 2015/1415* (2013.01)

(56) References Cited

OTHER PUBLICATIONS

A. Riaud et al., "Acoustic radiation force on small spheres due to transient acoustic fields," Phys. Rev. Applied, Apr. 12, 2021, pp. 1-9.

M. Baudoin et al., "Spatially selective manipulation of cells with single-beam acoustical tweezers," Nature Communications, Aug. 25, 2020, pp. 1-10.

D. Baresch et al., "Observation of a Single-Beam Gradient Force Acoustical Trap for Elastic Particles: Acoustical Tweezers," Physical Review Letters, Jan. 15, 2016, pp. 1-6.

Pei Yu Chiou et al., "Massively parallel manipulation of single cells and microparticles using optical images," Nature, Jul. 21, 2005, pp. 370-372.

Kai Melde et al., "Holograms for acoustics," Nature, Sep. 21, 2016, pp. 518-533.

V. Zharov et al., "Photoacoustic tweezers", International Symposium on Biomedical Optics, May 28, 2002, pp. 143-153, vol. 4622 San Jose, CA, U.S.

E. I. Galanzha et al., "In vivo acoustic and photoacoustic focusing of circulating cells," Scientific Reports, Mar. 16, 2016, pp. 1-15.

Yu-Chih Chen et al., "Selective Photomechanical Detachment and Retrieval of Divided Sister Cells from Enclosed Microfluidics for Downstream Analyses," ACS NANO, May 8, 2017, pp. 4660-4668.

V.P. Zharov et al., "Photoacoustic tweezers with a pulsed laser: theory and experiments," Journal of Physics D: Applied Physics, Jul. 22, 2005, pp. 2662-2674.

T. Sada et al., "Near-IR Laser-Triggered Target Cell Collection Using a Carbon Nanotube-Based Cell-Cultured Substrate," ACS Publications, May 31, 2011, pp. 4414-4421, vol. 5, No. 6.

M. Baudoin et al., "Folding a focalized acoustical vortex on a flat holographic transducer: Miniaturized selective acoustical tweezers," Science Advances, Apr. 12, 2019, pp. 1-6.

A. Ozcelik et al., "Acoustic tweezers for the life sciences", Nature Methods, Nov. 26, 2018, pp. 1021-1028, 15 (12).

* cited by examiner

PHOTOACOUSTIC TWEEZERS

BACKGROUND

Technical Field

This present invention relates to the field of acoustic manipulation, and more specifically to a method and an apparatus for trapping and manipulating particles.

Related Art

For trapping and manipulating particles, the optical method, pioneered by Arthur Ashkin in 1986, uses the forces exerted by a strongly focused beam of light to trap and move objects ranging in size from tens of nanometers to tens of micrometers. The method provides the highest degree of spatial resolution and high selectivity for a group of particles. However, manipulating particles larger than 1 μm is challenging due to small optical radiation force, and high-intensity laser heating as well as the use of high-numerical-aperture objective, all of which easily induces physiological damage to cells or other biological objects. More biocompatible alternatives to the optical method have been developed such as magnetic method, electrical method (electrophoresis, dielectrophoresis), hydrodynamic method, and acoustic method. They are capable of a variety of applications, including trapping, focusing, and sorting. Acoustic tweezers are label-free, independent of the electrical, optical and magnetic properties of the medium.

There is no ideal solution for particle manipulation combining biocompatibility, label-free, medium-insensitivity, selectivity, and high-throughput in prior art. For example, the magnetic method requires targets to be labeled with antibodies attached to magnetic microbeads. The design of antibodies is cost and labor-intensive and they need to be adjusted according to different cell types. Furthermore, the resolution of this magnetic method is poor because it would require magnetic field gradients at the micrometric scale, which is challenging to achieve by current means.

The electrical method can only work in poorly conducting media and is dependent on particle polarizability and medium conductivity. This method can be used on cells but cells will die quickly if they are not immersed in a suitable medium. Electrophoresis (EP) is the movement of an electrically charged surface relative to a stationary liquid and requires that the conductivity of the liquid is relatively low. The EP is limited by both particles and liquid. Dielectrophoresis (DEP) relies on a dielectric force acting on non-charged dielectric particles in a non-uniform electric field. The requirement of low-conductivity media and particle polarizability restricts its application.

The hydrodynamic method primarily uses fluid flow to control particles through balancing opposing transverse forces acting on the particles within a microchannel. This method has characteristics of high throughput and efficiency but is limited by channel structure and particle concentration.

The acoustic method uses acoustic waves to manipulate particles ranging in size from nanometer to millimeter in a contactless fashion. As the velocity of light is five orders of magnitude larger than sound speed, the acoustic method is able to afford forces 100,000 times larger than the optical method at equal power density. However, the acoustic method is not selective, or the newest selective acoustic vortex transducers can only manipulate a single particle at a time with low throughput.

A comparison of different contactless manipulation methods is shown in table 1 below:

TABLE 1

| Method | Size range | Biocompatibility | Label-free | Works with conductive liquids | Selectivity | High throughput |
|---|---|---|---|---|---|---|
| Optical method | 100 nm-1 μm | | No | | | |
| Magnetic method | 1 μm-10 μm | | | No | | |
| Optoelectronic method | 100 nm-10 μm | | | No | | |
| Acoustic method | 100 nm-10 mm | | | | No | |
| Acoustic vortex method | 1 μm-10 mm | | | | | No |

Therefore, no ideal method for particles manipulation exists yet. In principle, selective and versatile manipulation could be achieved by designing programmable acoustic arrays or mechanically moving acoustic sources. However, manipulating cells with the former would require ultra-high-end multichannel electronics and would be extremely prohibitive even for resolutions as low as 32×32 transducers. The latter (mechanical displacement of the acoustic source) is susceptible to wear and hardly allows overlap between multiple acoustic sources, which prohibits particle assembly. Therefore, precise, contactless, versatile, and selective manipulation of cells and particles remains undeveloped. Especially, versatile methods able to simultaneously and selectively manipulate several microparticles, or particles of various sizes have not been proposed yet. This prevents important applications such as particle assembly, which requires the simultaneous and selective manipulation of several particles.

At present, instead of using complicated miniaturized arrays of transducers, one may use light to generate acoustic waves, called photoacoustic generation (PA). The method uses a pulsed laser irradiation to hit a light-absorbing material, causing transient heating. The heat induces thermal expansion to generate acoustic waves. PA allows multiple choices for substrate material, as well as flexible aperture size to achieve high amplitude and high frequency. Acoustic waves generated by light can be easily tailored by optical signal without requiring programmable acoustic arrays. However, photoacoustic generation is poorly efficient and most of the light is converted to heat instead of the acoustic wave, which can result in excessive heat that can damage the cells.

SUMMARY

In view of the problems in the prior art that can't achieve a contactless, versatile, selective, and universal particle manipulation method. The present application proposes the photoacoustic tweezers which are bimodal transducer, also called electrophotoacoustic transducer, generating a weak acoustic wave and a strong acoustic wave. The weak wave provides the spatial information on which particle should be manipulated and where it should move. The strong acoustic wave behaves as an effective gain medium to amplify the acoustic radiation force of this weak acoustic wave. That is, after an interference of the strong acoustic wave and the weak acoustic wave, an amplified trapping force is produced for achieving particles manipulation. The objective of the present application is achieved by using the following technical solutions.

A method for trapping and manipulating particles, comprising:
  generating a weak acoustic wave and a strong acoustic wave through driving bimodal transducer, the weak acoustic wave and the strong acoustic wave interfere, the strong acoustic wave behaves as a gain medium to amplify the acoustic radiation force of the weak acoustic wave to achieve particle trapping and manipulation;
  wherein the strong acoustic wave has a larger amplitude than the weak acoustic wave.

The bimodal transducer comprises an electroacoustic transducer unit and a photoacoustic transducer unit.

The photoacoustic transducer unit is excited by some light pattern to generate the weak acoustic wave by photoacoustic effect. The light pattern may be a laser spot or a more complex pattern that can be positioned by a range of optomechanical means, including but not restricted to spatial light modulator, acousto-optic modulator, Pockels cell, piezoelectric and MEMS deformable mirror arrays, galvo-mirrors, translation platform and so on.

The strong acoustic wave is generated by driving the electroacoustic transducer unit. Preferably, the strong acoustic wave is driven by a burst of sinusoidal waves.

The strong acoustic wave is a plane wave.

The strong acoustic wave in the manipulation area is spatially uniform in terms of amplitude and phase.

The strong wave is uniform, which means the phase of the strong acoustic wave should not vary by more than pi/2, preferably by no more than pi/6, and even preferably by no more than pi/10. The amplitude of the strong acoustic wave should not vary by more than the weak one, preferably by no more than 10% of the weak one.

The strong acoustic wave is synchronized with the weak acoustic wave.

Preferably, the synchronization of the strong acoustic wave and the weak acoustic wave has an adjustable excitation delay between electroacoustic transducer unit and photoacoustic transducer unit when the ratio of the size of the manipulated particle to the wavelength of acoustic wave is less than 1.

Preferably, the direction of acoustic radiation force of the particle can be reversed by adjusting the phase difference between the strong acoustic wave and the weak acoustic wave.

The phase difference between weak acoustic wave and strong acoustic wave can be changed by adjusting the excitation delay of electroacoustic transducer unit and photoacoustic transducer unit. That is, changing the phase difference can reverse the acoustic radiation force from attraction (repulsion) to repulsion (attraction).

The weak acoustic wave is generated by driving the photoacoustic transducer unit with laser pulses.

The particles comprise polystyrene particles, microbubbles, droplets or biological particles.

Preferably, the biological particles comprise cells, microbes, small tissues patches such as organoids, DNA pellets. The invention uses a laser with lower power than the conventional optical tweezers, which can better protect the cell viability and reduce the damage to the cell caused by excessive temperature. The acoustic wave can manipulate cells, particles, tissues and so on without need magnetic or electrical properties with no need of a label.

A contactless manipulation system, comprising:
  signal generators and the electrophotoacoustic apparatus, the said apparatus comprise an electroacoustic transducer unit and a photoacoustic transducer unit.

The signal generators are used to excite the electrophotoacoustic apparatus. The electroacoustic transducer unit is excited to generate strong acoustic wave, and the photoacoustic transducer unit is excited to generate weak acoustic wave. The strong acoustic wave behaves as the gain medium to amplify the acoustic radiation force of the weak acoustic wave, thereby achieving particle trapping and manipulation.

Preferably, the photoacoustic transducer unit comprises a spectrally-selective nanoparticles-polydimethylsiloxane (PDMS) composite for converting laser pulses into photoacoustic pulses.

Preferably, the nanoparticles are gold nanoparticles (AuNP) to absorb in the band of nanosecond pulsed laser ranging from 510 nm to 540 nm.

Preferably, the electroacoustic transducer unit comprises transparent ITO electrodes which allow the system to be placed under a microscope to observe particle manipulation.

Compared with the prior art, the photoacoustic tweezers in the present application have the following advantages:

(1) The present application uses a laser with lower power than the optical tweezers. Before illuminating the cells, the laser beam is absorbed by the photoacoustic transducer unit, and the method does not need label pretreatment or direct contact between the laser and cells, and therefore can limit cell damage caused by excessive temperature.

(2) The present invention can synthesize reconfigurable acoustic fields to achieve the versatile manipulation of particles of various sizes. The size of the manipulated particles ranges from 1 μm to 1 mm. The present application can also achieve the simultaneous and selective manipulation of multiple objects in high throughput and provide new functions such as particle assembly.

(3) The photoacoustic tweezers in this application can reverse the acoustic radiation force direction by adjusting the phase difference between the strong acoustic wave and the weak acoustic wave, and the tweezers can push or pull particles.

(4) The implementation of the method in this application is much simpler and there is no need for sophisticated acoustic arrays or mechanically moving acoustic source for selective manipulation. It is a solution for contactless particle manipulation combining biocompatibility, label-free, medium-insensitivity, selectivity, and high-throughput.

BRIEF DESCRIPTION OF THE DRAWINGS

The present description will be better understood from the following detailed description and the accompanying drawings. The details of the present invention, regarding its structure and operation, can be best understood by referring to the accompanying drawings, in which like reference numbers and designations refer to like elements.

The following are descriptions of identifiers in the figures: 100: glass slide; 101: medium; 102: particle; 103: piezoelectric material; 104: PDMS microchannel; 105: AuNP-PDMS composite; 106: ITO electrode; 107: PDMS; 108: piezoelectric ceramic sheet.

DETAILED DESCRIPTION OF EMBODIMENTS

The present application is described in detail below with reference to the accompanying drawings and specific embodiments.

Embodiment 1

Figure 1:
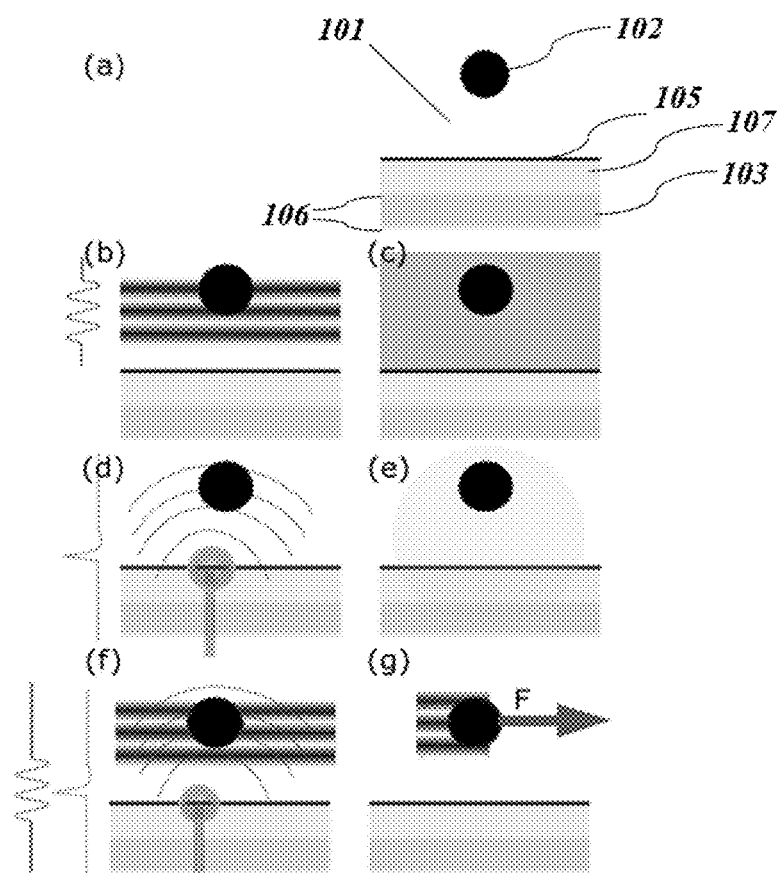
FIG. 1 shows the principle diagram of the gain medium for acoustic tweezers according to the present application.

As shown in FIG. 1, the principle diagram of the gain medium 101 amplification for photoacoustic tweezers. The present application discloses a method to increase the trapping force of photoacoustic tweezers by behaving as an effective gain medium 101.

As shown in FIG. 1a, a LiNbO3 (Y-cut 36°) piezoelectrical material 103 coated with the transparent ITO electrodes 106 as an electroacoustic transducer unit. Polydimethylsiloxane (PDMS) 107 is spin coated on the electroacoustic transducer unit as an intermediate layer. The AuNP-PDMS composite 105 is prepared by in-situ synthesis of gold nanoparticles on the surface of the PDMS intermediate layer as a photoacoustic transducer unit. The electroacoustic transducer unit is driven by a burst of sinusoidal wave to generate a strong acoustic wave, and the photoacoustic transducer unit is excited to convert laser pulses into photoacoustic pulses, and therefore to produce the weak acoustic wave. Particles 102 are suspended in the medium 101. In this embodiment, the medium 101 is water and the particles 102 are cells.

As shown in FIG. 1b, when only a burst of a sinusoidal wave is used for the electroacoustic transducer unit, the strong acoustic wave is generated. The strong acoustic wave acts on the aqueous medium 101 to form the gain medium 101. The burst of a sinusoidal wave is a solid line shown in FIG. 1b. The strong acoustic wave is spatially uniform shown in FIG. 1c, and in this case, and the force acting on the particles 102 is zero. When only a laser pulse is used to the photoacoustic transducer unit, the weak acoustic wave is generated, as shown by the dotted line in FIG. 1d. As shown in FIG. 1e, the acoustic radiation force of the weak acoustic wave is small, so the particles 102 cannot be manipulated. As shown in FIG. 1f, synchronously triggered by the laser pulses and the burst of sinusoidal wave, the invention generates the strong acoustic wave behaving as the gain medium 101 to amplify the acoustic radiation force of the generated weak acoustic wave, and finally generates the force F as shown in FIG. 1g, to achieve the trap and manipulation of particles 102. The force direction can be reversed by adjusting the phase difference of the strong and weak acoustic waves, and the behaviors of particles 102 are attraction and repulsion. The present application increases the manipulation capability of photoacoustic tweezers by behaving as an effective gain medium 101 for the amplified acoustic radiation force. the frequency of the strong acoustic wave ranges from 1 Hz to 1 GHz with amplitude ranging from 1 Pa to $10^{10}$ Pa.

The strong acoustic wave cannot move particles 102 in the plane transverse to the propagation axis (hereafter called the transverse plane, or manipulation plane). The frequency of the weak acoustic wave ranges from 1 Hz to 1 GHZ, and the amplitude of the weak acoustic wave ranging from 1 Pa to $10^8$ Pa, is smaller than that of the strong acoustic wave.

Selectivity, versatility and higher throughput are obtained by adjusting the acoustic pattern of the weak wave. This adjustment is done by exciting the photoacoustic transducer unit using tunable light patterns. Here, the light pattern may be a laser spot or a more complex pattern that can be positioned by a range of optomechanical means, including but not restricted to spatial light modulator, acousto-optic modulator, Pockels cell, piezoelectric and MEMS deformable mirror arrays, galvo-mirrors, translation platform and so on.

In this embodiment, the interference between the weak acoustic wave and the strong acoustic wave would form a non-uniform spatial intensity that could move the particle 102. The magnitude of the interfering pattern would be proportional to the product of both waves. Because the strong acoustic wave is spatially uniform, and it can be seen as a constant gain acting on the weak acoustic wave. In other words, the medium 101 irradiated by the uniform strong acoustic field is the gain medium 101 of the weak acoustic wave.

Figure 2:
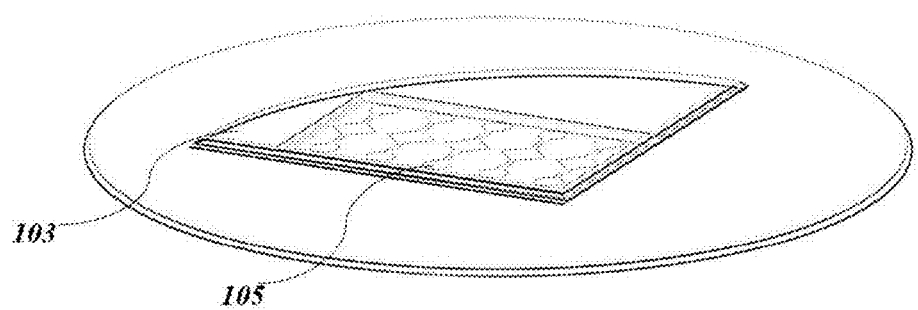
FIG. 2 is a schematic diagram of the photoacoustic tweezers prepared in embodiment 1 of the present invention.

FIG. 2 shows the schematic diagram of photoacoustic tweezers in embodiment 1. A plurality of transparent indium tin oxide (ITO) electrodes 106 are coated on lithium niobate (Y-cut 36° LiNbO3) piezoelectric material 103 as electroacoustic transducer unit. Polydimethylsiloxane (PDMS) 107 is spin coated on electroacoustic transducer unit as the intermediate layer, and the AuNP-PDMS photoacoustic composite 105 is prepared by generating gold nanoparticles on the surface of the intermediate layer by in-situ synthesis as photoacoustic transducer unit. The manipulation medium 101 containing target is both above the electroacoustic transducer unit and photoacoustic transducer unit. The electroacoustic transducer unit is driven by the burst of sinusoidal wave to generate the strong acoustic wave. The photoacoustic transducer unit is driven by laser pulses to produce the weak acoustic wave by thermal expansion. The strong and weak acoustic waves are acoustically connected through the manipulating medium 101. The strong acoustic wave amplifies the acoustic radiation force of the weak acoustic wave to precisely and versatilely trap and manipulate particles 102.

This embodiment describes a specific implementation method of the radiation force amplified by the gain medium 101. The medium 101 containing the target is above the photoacoustic tweezers which are the combination of the electroacoustic transducer unit and the photoacoustic transducer unit through the intermediate layer. Any other methods that can achieve the amplification of the gain medium 101 belong to the protection scope of the invention. The weak acoustic wave is generated from the photoacoustic transducer unit which is irradiated by low-intensity laser pulses. The photoacoustic transducer unit is the photoacoustic composite, which converts the laser pulses into the photoacoustic pulses to generate the weak acoustic wave. This method can achieve trapping and manipulation of particles 102 in the size range of 1 μm to 1 mm.

Figure 4:
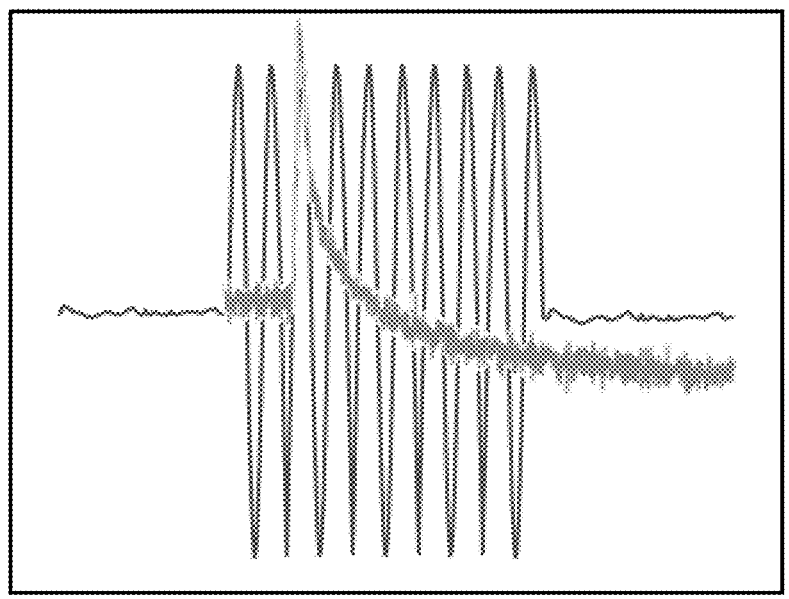
FIG. 4 shows the electroacoustic trigger signal and photoacoustic signal.

FIG. 4 shows the diagram of the burst signal of sinusoidal wave for the strong acoustic wave and the photoacoustic pulse signal for the weak acoustic wave. The specific explanation is as follows, writing the pressure and velocity fields from the strong acoustic wave as $p^{(Z)}$ and $v^{(Z)}$, similarly, the pressure and velocity field from the weak acoustic wave as $p^{(L)}$ and $v^{(L)}$. Note that other generation methods of acoustic waves would also work, provided that the Z field is as least an order of magnitude stronger than the L field.

The total field of the strong and weak acoustic wave reads:

$$p = p^{(Z)} + p^{(L)}, \quad (1a)$$

$$v = v^{(Z)} + v^{(L)}, \quad (1b)$$

the acoustic radiation force on small spheres by two acoustic fields reads:

$$F = -V_p \nabla U, \quad (2)$$

with the Gor'kov potential U:

$$U = f_1 \frac{\langle p^2 \rangle}{2\rho_0 c_0^2} - \frac{3}{4} f_2 \langle \rho_0 v^2 \rangle, \quad (3)$$

as shown in Eq. (3), $c_0$ represents the speed of sound in the fluid medium 101, $\rho_0$ represents the density of the fluid medium 101, $f_1$ and $f_2$ represent the monopolar and dipolar scattering coefficients. Expanding p and v with the Eq. (1a) and (1b), neglecting very small term in $(L)^2$ and assuming that the strong acoustic field is a plane wave of uniform amplitude propagating along the z direction ($v^{(Z)} = v_z^{(Z)} e_z$), we get $U = U^{(ZZ)} + U^{(ZL)}$. $U^{(ZZ)}$ is a uniform Gor'kov potential and therefore its gradient is zero. Consequently, U is dominated by $U^{(ZL)}$. In order to evaluate the mixed potential $U^{(ZL)}$, we consider only the strongest harmonic of the (L) field and set the phase reference on the (Z) pressure field, noting that the Z-field is a plane traveling wave $\hat{p}^{(Z)}$, and $\hat{i}_z^{(Z)} \in R$:

$$U^{(ZL)} = \hat{p}^{(Z)} \left[ f_1 \frac{|\hat{p}^{(L)}| \cos(\varphi_0 + \varphi_p)}{2\rho_0 c_0^2} - \frac{3}{4Z} f_2 \rho_0 |\hat{v}_z^{(L)}| \cos(\varphi_0 + \varphi_v) \right]. \quad (4)$$

Wherein $\varphi_0$ is a user-controlled spatially uniform phase difference due to the excitation delay between the strong and weak acoustic waves. At this point, it is clear that the background pressure field $p^{(Z)}$ acts as a uniform gain on the mixed potential. After some trigonometric manipulation, we can factor out all the spatially-uniform fields:

$$U^{(ZL)} = \hat{p}^{(Z)} [Xc^{(ZL)} \cos(\varphi_0) - Xs^{(ZL)} \sin(\varphi_0)]. \quad (5a)$$

$$\text{with: } Xc^{(ZL)} = \left[ f_1 \frac{|\hat{p}^{(L)}| \cos \varphi_p}{2\rho_0 c_0^2} - \frac{3}{4Z} f_2 \rho_0 |\hat{v}_z^{(L)}| \cos \varphi_v \right], \quad (5b)$$

$$\text{and } Xs^{(ZL)} = \left[ f_1 \frac{|\hat{p}^{(L)}| \sin \varphi_p}{2\rho_0 c_0^2} - \frac{3}{4Z} f_2 \rho_0 |\hat{v}_z^{(L)}| \sin \varphi_v \right]. \quad (5c)$$

Writing the force component along the x direction (y would yield exactly similar results), we get:

$$F_x = \hat{p}^{(Z)} f_x \cos(\theta + \varphi_0), \quad (6a)$$

$$\text{with: } f_x = \sqrt{(\partial_x \chi_c^{(ZL)})^2 + (\partial_x \chi_s^{(ZL)})^2}, \quad (6b)$$

$$\text{and } \theta = \arctan 2 \left( \frac{\partial_x \chi_s^{(ZL)}}{f_x}, \frac{(\partial_x \chi_c^{(ZL)})}{f_x} \right). \quad (6c)$$

Eq. (6a) indicates: (i) that the force is proportionally amplified by the background field, (ii) that the force direction can be reversed by adjusting the phase difference between the electroacoustic (Z) and photoacoustic (L) fields.

The invention uses the strong acoustic wave to behave as an effective gain medium 101, to amplify the acoustic radiation force of the weak acoustic wave for particle 102 trapping and manipulation. The strong acoustic wave and the weak acoustic wave are acoustically connected through the manipulation medium 101 to produce the effective interference.

Embodiment 2

The principle of the present embodiment is substantially the same as embodiment 1. In the present embodiment, the manipulation medium 101 containing the target is between the electroacoustic transducer unit and the photoacoustic transducer unit.

Figure 3:
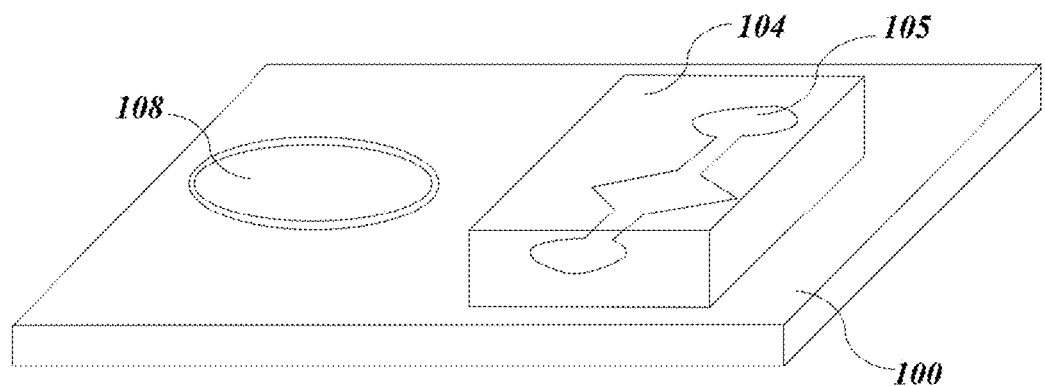
FIG. 3 is a schematic diagram of photoacoustic tweezers prepared in embodiment 2 of the present invention.

FIG. 3 shows the schematic diagram of the prepared photoacoustic tweezers in this embodiment. The piezoelectric ceramic disc 108 is glued on the transparent glass slide 100 as the electroacoustic transducer unit. The photoacoustic composite 105 is synthesized by preparing AuNP in PDMS microchannel 104 by in-situ synthesis as the photoacoustic transducer unit. The manipulation medium 101 containing the target particle 102 is located between the photoacoustic transducer unit and the electroacoustic transducer unit. The electroacoustic transducer unit is driven by the burst of sinusoidal wave to generate the strong acoustic wave. The photoacoustic transducer unit is driven to generate the weak acoustic wave. The strong and weak acoustic waves are acoustically connected through the manipulation medium 101. The strong acoustic wave amplifies the acoustic radiation force of the weak acoustic wave to precisely and versatilely trap and manipulate particles 102.

This embodiment describes a specific implementation method of the radiation force amplified by the gain medium 101. The medium 101 containing the target is between the electroacoustic transducer unit and the photoacoustic transducer unit. Any other methods that can achieve the amplification of the gain medium 101 belong to the protection scope of the invention.

Although the present application and implementation thereof have been exemplarily described above, the description is not limiting. The present application can be implemented in other specific forms without departing from the spirit or the basic feature of the present application. The content shown in the accompanying drawings is merely one of the implementations of the present application, and the actual structure is not limited there to it. Any reference signs in the claims should not be construed as limiting the claims. Therefore, under the teaching of the present application, any structures and embodiments similar to the technical solution that is made by those skilled in the art without creative efforts and without departing from the spirit of the present application shall all fall within the protection scope of the present application. In addition, the word "include" does not exclude other elements or steps, and the word "a/an" before the element is not excluded from including "a plurality of" the elements. A plurality of elements described in the product claims may also be implemented by an element by software or hardware. The words such as first, second, and the like are used to denote names and do not denote any particular order.

The invention claimed is:

1. A method for trapping and manipulating particles, comprising:
generating a weak acoustic wave and a strong acoustic wave through driving a bimodal transducer wherein the strong acoustic wave behaving as a gain medium amplifies the acoustic radiation force of the weak acoustic wave to achieve particle trapping and manipulation;
wherein the strong acoustic wave has a larger amplitude than the weak acoustic wave.

2. The method according to claim 1, wherein the strong acoustic wave is generated by driving an electroacoustic transducer unit.

3. The method according to claim 2, wherein the strong acoustic wave in the manipulation area is spatially uniform in terms of amplitude and phase.

4. The method according to claim 3, wherein the phase of the strong acoustic wave does not vary within the manipulation area by more than pi/2, and the amplitude of the strong acoustic wave does not vary within the manipulation area by more than the amplitude of the weak acoustic wave.

5. The method according to claim 2, wherein the strong acoustic wave is a plane wave.

6. The method according to claim 1, wherein the strong acoustic wave is synchronized with the weak acoustic wave.

7. The method according to claim 6, wherein the synchronization of the strong acoustic wave and the weak acoustic wave has an adjustable excitation delay between an electroacoustic transducer unit and a photoacoustic transducer unit when the ratio of the size of a manipulated particle and a wavelength of the acoustic wave is less than 1.

8. The method according to claim 7, wherein the direction of acoustic radiation force of the particle can be reversed by adjusting the phase difference between the strong acoustic wave and the weak acoustic wave.

9. The method according to claim 1, wherein the weak acoustic wavefield is adjusted to exert forces specifically on all or a subset of the particles.

10. The method according to claim 9, wherein the weak acoustic wave field is adjusted by generating it with an adjustable light pattern.

11. The method according to claim 9, wherein the weak acoustic wave is generated from a photoacoustic transducer unit through photoacoustic conversion of an adjustable light pattern, and the light source is a pulsed laser generator.

12. The method according to claim 1, wherein the particles comprise polystyrene particles, microbubbles, droplets, or biological particles.

13. The method according to claim 12, wherein the biological particles are cells, microbes, small tissues patches.

14. The method of claim 1, wherein the bimodal transducer comprises a photoacoustic transducer unit and an electroacoustic transducer unit,
wherein generating the strong acoustic wave comprises activating the electroacoustic transducer unit with an electrical signal, and
wherein generating the weak acoustic wave comprises photoacoustic conversion when a photoacoustic transducer unit is illuminated by a laser beam.

15. The method of claim 1, wherein a pressure field from the strong acoustic wave is at least an order of magnitude greater than a pressure field from the weak acoustic wave.

16. A contactless manipulation system, comprising:
signal generators and an electrophotoacoustic apparatus, wherein the electrophotoacoustic apparatus comprises an electroacoustic transducer unit and a photoacoustic transducer unit;
the signal generators are used to excite the electrophotoacoustic apparatus, whereby the electroacoustic transducer unit is excited to generate a strong acoustic wave, and the photoacoustic transducer unit is excited to generate a weak acoustic wave, and the strong acoustic wave behaves as the gain medium to amplify the acoustic radiation force of the weak acoustic wave to achieve particle trapping and manipulation.

17. The system according to claim 16, wherein the photoacoustic transducer unit comprises a spectrally-selective nanoparticles-polydimethylsiloxane (PDMS) composite for converting laser pulses into photoacoustic pulses.

18. The system according to claim 17, wherein the nanoparticles are gold nanoparticles (AuNP) to absorb in the band of nanosecond pulsed laser ranging from 510 nm to 540 nm.

19. The system according to claim 18, wherein the electroacoustic transducer unit comprises transparent ITO electrodes which allow the system to be placed under a microscope to observe particle manipulation.

20. The system of claim 16, wherein a pressure field from the strong acoustic wave is at least an order of magnitude greater than a pressure field from the weak acoustic wave.

* * * * *